(12) United States Patent
Zhu et al.

(10) Patent No.: US 10,277,401 B2
(45) Date of Patent: *Apr. 30, 2019

(54) SYSTEMS AND METHODS FOR AUTHENTICATING AND PROVIDING ANTI-COUNTERFEITING FEATURES FOR IMPORTANT DOCUMENTS

(71) Applicant: SMARTRAC TECHNOLOGY FLETCHER, INC., Fletcher, NC (US)

(72) Inventors: Jeffrey Zhu, Carlsbad, CA (US); Jun Liu, San Diego, CA (US)

(73) Assignee: SMARTRAC TECHNOLOGY FLETCHER, INC., Fletcher, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/727,801

(22) Filed: Oct. 9, 2017

(65) Prior Publication Data

US 2018/0034638 A1    Feb. 1, 2018

Related U.S. Application Data

(63) Continuation of application No. 15/157,246, filed on May 17, 2016, now Pat. No. 9,794,069, which is a continuation of application No. 12/135,822, filed on Jun. 9, 2008, now Pat. No. 9,344,280.

(60) Provisional application No. 60/942,600, filed on Jun. 7, 2007.

(51) Int. Cl.
*H04L 9/32* (2006.01)

(52) U.S. Cl.
CPC .......... *H04L 9/3231* (2013.01); *H04L 9/3247* (2013.01); *H04L 2209/60* (2013.01); *H04L 2209/805* (2013.01); *H04N 2201/0094* (2013.01)

(58) Field of Classification Search
CPC . H04L 9/3231; H04L 9/3247; H04L 2209/60; H04L 2209/805
See application file for complete search history.

(56) References Cited

U.S. PATENT DOCUMENTS

| | | | |
|---|---|---|---|
| 5,872,848 | A | 2/1999 | Romney et al. |
| 6,202,151 | B1 | 3/2001 | Musgrave et al. |
| 6,397,334 | B1 | 5/2002 | Chainer et al. |

(Continued)

FOREIGN PATENT DOCUMENTS

| | | |
|---|---|---|
| GB | 2391988 A | 2/2004 |
| WO | 2006069611 A2 | 7/2006 |

OTHER PUBLICATIONS

Machine Readable Travel Documents part 1 ICAO Doc 9303, 2006.
(Continued)

*Primary Examiner* — Saleh Najjar
*Assistant Examiner* — Louis C Teng
(74) *Attorney, Agent, or Firm* — Procopio, Cory, Hargreaves & Savitch LLP

(57) ABSTRACT

A method for authenticating a document comprises obtaining the contents of a document, obtaining biometric characteristics from an individual, forming a message based on the contents of the document and the biometric characteristics of the individual, generating a digital signature based on the message and a key, and writing the digital signature to an Radio Frequency Identification (RFID) tag affixed to the document.

16 Claims, 3 Drawing Sheets

(56) References Cited

U.S. PATENT DOCUMENTS

| | | | |
|---|---|---|---|
| 6,463,416 B1 * | 10/2002 | Messina | G06Q 20/20 235/380 |
| 6,490,680 B1 | 12/2002 | Scheidt et al. | |
| 6,553,494 B1 * | 4/2003 | Glass | G06F 21/32 713/176 |
| 6,611,598 B1 * | 8/2003 | Hayosh | G06Q 20/042 380/54 |
| 6,819,219 B1 | 11/2004 | Bolle et al. | |
| 7,170,391 B2 * | 1/2007 | Lane | G06K 19/025 340/5.82 |
| 7,720,221 B2 * | 5/2010 | Brown | H04L 9/3066 380/30 |
| 2003/0089764 A1 * | 5/2003 | Meadow | G06Q 20/341 235/375 |
| 2005/0010776 A1 * | 1/2005 | Kenen | G06Q 20/341 713/176 |
| 2005/0044388 A1 * | 2/2005 | Brant | H04L 63/0428 713/186 |
| 2006/0174353 A1 | 8/2006 | Ryal | |
| 2006/0206714 A1 | 9/2006 | Gubo | |
| 2006/0282672 A1 | 12/2006 | Sanchez et al. | |
| 2007/0056041 A1 | 3/2007 | Goodman | |
| 2007/0078559 A1 | 4/2007 | Rosen | |
| 2007/0102920 A1 | 5/2007 | Bi et al. | |
| 2007/0206248 A1 * | 9/2007 | Winterbottom | G06K 9/00006 359/2 |
| 2009/0232346 A1 | 9/2009 | Zilch | |
| 2013/0212397 A1 * | 8/2013 | Lehwany | G06F 21/64 713/176 |

OTHER PUBLICATIONS

Machine Readable Travel Documents Technical Report PKI for Machine Readable Travel Documents offering ICC Read-Only Access v1. 1 Oct. 1, 2004.

Pim Tuyls and Lejia Batina, "RFID-Tags for Anti-counterfeiting" Topics in Cryptology—CT-RSA 2006. Lecture Notes in Computer Science, 2006, vol. 38602006, 115-131 (retrieved from SpringerLink database on Sep. 26, 2011).

Juels, A: Moinar, D. ; Wagner, D. "Security and Privacy Issues in E-passports", Scurity and Privacy for Emerging Areas in Communication Networks, 2005, SecureComm 2005. First International Conference on; Sep. 5-9, 2005k, pp. 74-88 (retrieved from IEEE database on Sep. 26, 2011.

* cited by examiner

SYSTEMS AND METHODS FOR AUTHENTICATING AND PROVIDING ANTI-COUNTERFEITING FEATURES FOR IMPORTANT DOCUMENTS

RELATED APPLICATIONS INFORMATION

This application is a continuation of U.S. patent application Ser. No. 15/157,246 filed on May 17, 2016, which is a continuation of U.S. patent application Ser. No. 12/135,822, filed on Jun. 9, 2008, which claims priority under 35 U.S.C. 119(e) to U.S. Provisional Patent Application Ser. No. 60/942,600, entitled "SYSTEMS AND METHODS FOR AUTHENTICATING AND PROVIDING ANTI-COUNTERFEITING FEATURES FOR IMPORTANT DOCUMENTS", filed Jun. 7, 2007, which is incorporated herein in its entirety as if set forth in full.

BACKGROUND INFORMATION

1. Technical Field

The embodiments described herein relate to document information leakage, authentication and anti-counterfeiting, and more particularly to the use of Radio Frequency Identification (RFID) technology to ensure that documents are authentic and cannot be copied without permission.

2. Related Art

There are several known techniques for ensuring the authenticity and preventing anti-counterfeiting of various documents. For example, special inks, holographs, special papers, etc., have been used to ensure that documents are authentic and cannot be counterfeited.

Digital signature schemes have also been developed in order to increase the security of important documents. A digital signature scheme is a type of asymmetric cryptography used to simulate the security properties of a signature in digital rather than written form. A digital signature scheme normally has two algorithms, one for signing, which involves the use of a secret or private key, and one for verifying the digital signature, which involves the use of a public key. It is the output of the signing algorithm using the private key that is referred to as the digital signature. Thus, digital signatures can be used to authenticate the associated input (i.e., message) to the signing algorithm. The message can be anything from an electronic document, an email, digitize-able characteristics of physical object or a physical contract or document.

A digital certificate can contain the sender's public key as well as other information. The digital certificate and digital signature can both be transmitted to a receiver so that the receiver can verify the signature using the sender's public key. In a conventional public key infrastructure, there is a Certificate Authority (CA) to issue, distribute, and authenticate digital certificates so that senders and receivers can rely on the CA.

SUMMARY

Systems and methods that allow for the authentication and anti-counterfeiting of important documents are described herein.

According to one aspect, A method for authenticating a document comprises obtaining the contents of a document, obtaining biometric characteristics from an individual, forming a message based on the contents of the document and the biometric characteristics of the individual, generating a digital signature based on the message and a key, and writing the digital signature to an Radio Frequency Identification (RFID) tag affixed to the document.

According to one aspect, a method for generating a digital certificate can comprise obtaining optical characteristics of a document, obtaining biometric characteristics from an individual, forming a message, generating a digital signature, writing the digital signature to an Radio Frequency Identification (RFID) tag, locking the RFID tag, and verifying the digital signature.

According to another aspect, A method for controlling access to a document comprises obtaining the contents of a document, obtaining biometric characteristics from an individual, forming a message based on the contents of the document and the biometric characteristics of the individual, generating a digital signature based on the message and a key, determining a protection level for the document, writing the digital signature and the protection level into an RFID tag affixed to the document, reading the digital signature and the protection level out of the RFID tag, obtaining an individual's credentials, authenticating the digital signature using a key, authenticating the individual's credentials, and granting access to the document based on the protection level and the authentication of the credentials.

According to still another embodiment, a system for generating a digital certificate comprises a document containing information, and an RFID tag affixed to the document, the RFID tag configured to store a digital signature formed from the contents of the document and a key.

According to another embodiment, a system for generating a digital certificate comprises a document containing information, and an optical memory affixed to the document, the optical memory configured to store a digital signature formed from the contents of the document and a key, and an RFID tag affixed to the document, the RFID tag configured to store a key used to verify the signature.

These and other features, aspects, and embodiments are described below in the section entitled "Detailed Description."

BRIEF DESCRIPTION OF THE DRAWINGS

Features, aspects, and embodiments are described in conjunction with the attached drawings, in which.

DETAILED DESCRIPTION

Figure 1:
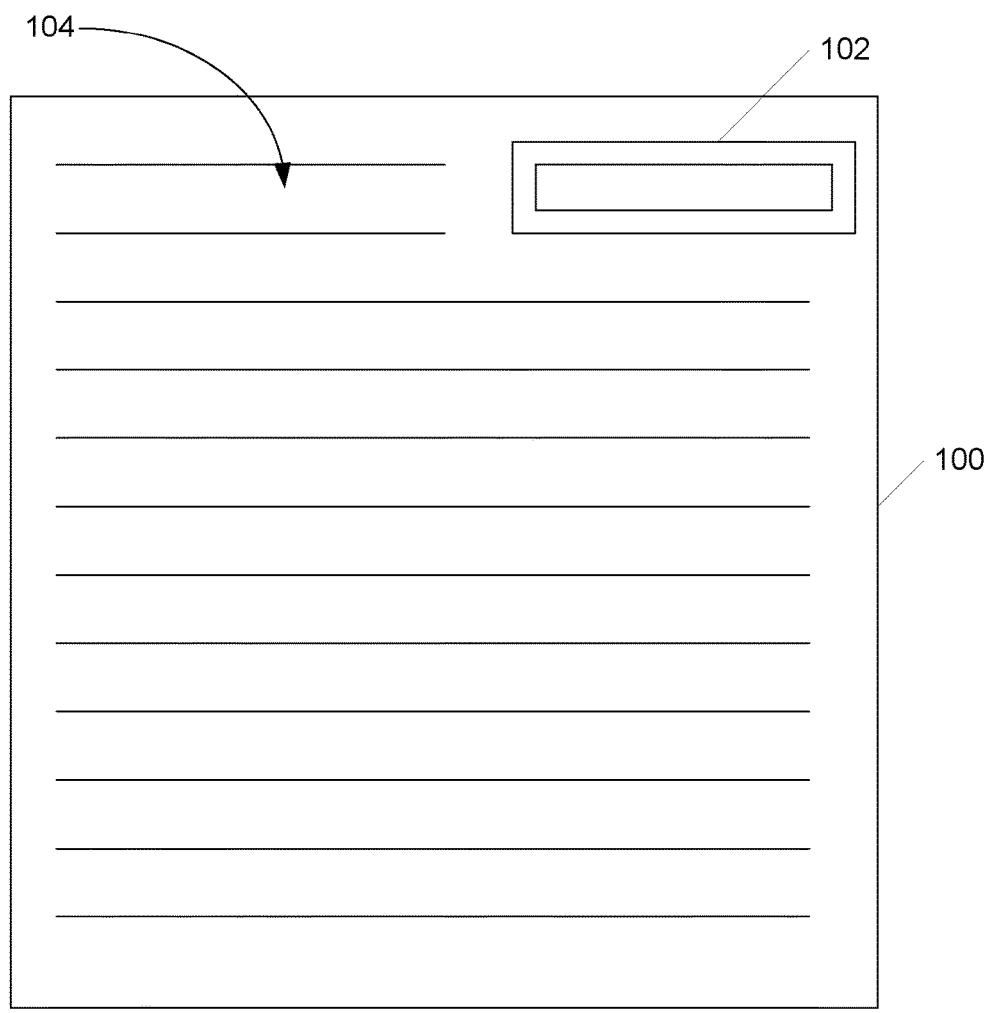
FIG. 1 is a diagram showing a document according to one embodiment described herein.

FIG. 1 is a diagram illustrating a document 100 the contents of which can be protected using the systems and methods described herein. Referring to FIG. 1, information can be stored on Radio Frequency Identification (RFID) label 102 (also referred herein as an RFID tag) and can be used to authenticate the document 100.

A digital signature can be generated and can be written into an RFID tag, or a label that can be affixed to the document 100. The digital signature can then be read out and verified in order to provide authentication, anti-counterfeiting, and even privacy capabilities. The digital signature can be signed upon the message that can be based on a combination of the contents of the document, the optical characteristics of the document, biometric characteristics of the owner of the document, or a person transporting or handling the document, or a person wishing to read or copy the document.

The digital signature can be written into the RFID tag using e.g., a proprietary writing scheme or key exchange scheme and the RFID tag memory can be locked in order to prevent someone from altering the contents of the RFID memory. Further, the RFID tag can be a tamper-proof tag such that if the RFID tag is removed from the document, it will damage the RFID tag and prevent it from being read in the future. The systems and methods described herein can be used, e.g., on ID cards, passports, licenses, birth certificates, and other high valued certificates and documents.

Figure 2:
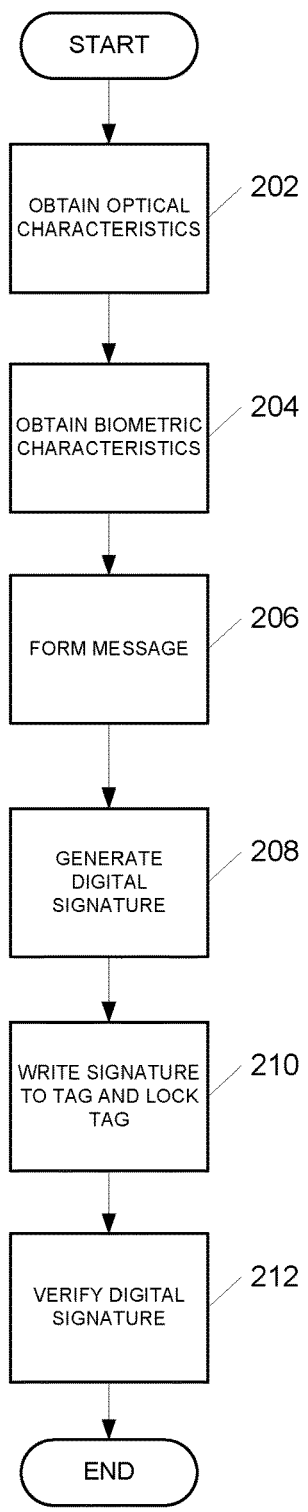
FIG. 2 is a flowchart illustrating a method for providing document authentication according to one embodiment described herein.

FIG. 2 is a flowchart illustrating a method for providing document authentication according to one embodiment described herein. Referring to FIG. 2 and FIG. 1, in one embodiment, this method can, for instance, be used to authenticate document 100 using information that can be stored in RFID label 102. Additionally, certain optical characteristics of document 100 can be obtained and used as part of the message.

According to one embodiment, all of the text 104 of document 100 can be scanned and used as the message for generating the digital signature. In other embodiments, only certain letters within text 104 can be used in order to generate the message, for use in generating the digital signature. For example, the first letter of every line, the first word of every sentence, or certain strategically selected words or letters, e.g., that themselves form a secret word or message, can be extracted from text section 104 and used to form the message.

Alternatively, certain portions of text 104 can be printed in special inks and only the text printed in these special inks can be used to form the message for use to generating the digital signature. For example, invisible ink, e.g., only visible using an ultra violet light, can be used to print portions of text 104. This invisible portion of text 104 can be used to form the message. Alternatively, portions of text 104 can be printed in a graded pattern of security print and these portions of text 104 can be used to form the message used to generate the digital signature.

As illustrated in step 204, certain biometric information can also be obtained and used to form part of the message. Biometric information can include fingerprint information, face scan information, iris pattern or eye scan information, etc. The biometric information can be read by a reader and input into a computer along with the optical characteristics in order to generate the message. The biometric information can belong to, e.g., the author, or owner of document 100 or the person carrying document 100.

In step 206, the optical characteristics and biometric information can be turned into a message that can be used to generate the digital signature in step 208, e.g., using public/private key technology (i.e. signed by a private key). In step 210, the digital signature can be written into RFID label 102, e.g., using a proprietary writing scheme. As mentioned above, the memory of RFID label 102 can then be locked in order to prevent tampering with the data written in the RFID tag 102. Further, RFID tag 102, can itself, be a tamper-proof tag, such that if the tag is pulled off or physically tampered with, it will not be capable of being read in the future, the original document will be left with evidence of tampering.

In order to authenticate document 100, the digital signature can be read out of RFID label 102 in step 212, and verified, e.g., using public/private key technology. At the same time, the optical characteristics of document 104, and/or the biometric information obtained in step 204, can also be verified. In this manner, the authenticity of the document, as well as the identity of the author/owner or carrier can both be verified.

The key used to verify the digital signature in RFID tag 102 can be stored in, e.g., a special ink, security print, hologram, micro-print, optical memory, or bar code label, which can also be affixed to or included with the document 100. Thus, the user may need to be at a specific station, which can be configured to read the key in order to verify the signature contained in the RFID tag 102. The key for signature verification is the public key when the public/private key technology is used. One benefit to this method is that no CA or distribution system is required to issue or authenticate digital certificates (i.e. public keys) because a public key can be carried with the document itself in various means, for instance, but not limited to those described above.

Figure 3:
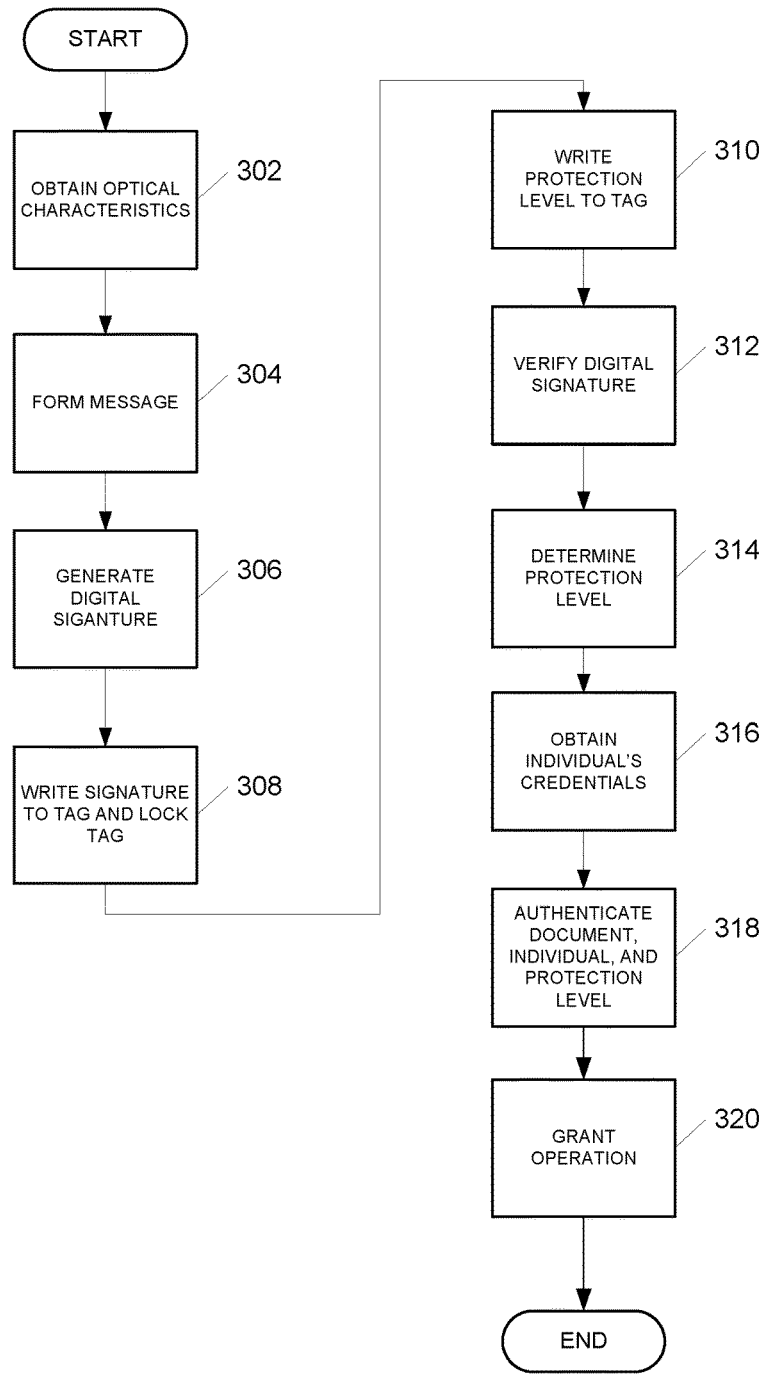
FIG. 3 is a flowchart illustrating a method for anti-counterfeiting of a document according to one embodiment described herein.

FIG. 3 is a flowchart illustrating a method for anti-counterfeiting of a document 100, according to one embodiment described herein. As with the method described with respect to FIG. 2, the method with respect to FIG. 3 can begin in step 302 by obtaining the optical characteristics of the document at issue. These optical characteristics can then be turned into a message in step 304, which can be used to form a digital signature in step 306. The digital signature can then be written into RFID label 102 in step 308. Additionally, a protection level can also be written into RFID label 102 in step 310. The protection level can indicate a level of access and specify who can access the document. For example, in one embodiment, the protection level can indicate a document status such as "read-only", or "not read-only," which can indicate whether the document can be copied. In other embodiments, a class of people can be given certain rights. For example, the protection level could indicate that the document can be read by the public but not copied, or copied by certain individuals (e.g., a supervisor, etc.), or multiple levels of protection based on the authentication used to make the document readable.

Reading or copying stations can then be equipped with special lighting features, e.g., in order to read various inks used to produce texts portion 104, an RFID reader in order to read label 102, and a biometric scanner, e.g., a fingerprint scanner, face scanner, iris scanner, etc., in order to verify the identity of a person using the reading or copying station. Thus, in step 312, if someone wishes to read or copy document 100 using the reading or copying station, the digital signature can be read out of tag 102 and verified. In step 314, the protection level can be read and in step 316, the individual's credentials, i.e., biometric information, can be read or scanned. In step 318, the station can authenticate the document, the individual, and the protection level before allowing the individual to proceed in step 320 where the operation (e.g. read message content) is granted.

For example, if the individual is trying to copy the document, then a copier can be configured to stay inactive until the authentications of step 318 are achieved. After successful authentication in step 318, the copier would turned on and the individual be allowed to make a copy. It should be noted, that the copier might need to be equipped with special lighting features in order to make certain portions of text 104 capable of being copied. Similarly, if the station is a reading station, then once the verifications of step 318 are carried out, the individual could be allowed to read the document which can comprise activating special lighting features in order to make text portion 104 visible.

Further methods for ensuring the authenticity of information or items are described in detail in U.S. patent application Ser. No. 11/270,067, entitled "Systems and Methods for Tracking Containers," filed Nov. 9, 2005, and incorporated herein by reference as if set forth in full. Methods for using biometric information to ensure secure authentication of information are described in detail in U.S. patent application Ser. No. 11/29,912, entitled 'System and Method for Providing Secure Identification Solutions," filed Apr. 17, 2006, which is also incorporated herein as if set forth in full.

While certain embodiments have been described above, it will be understood that the embodiments described are by way of example only. Accordingly, the systems and methods described herein should not be limited based on the described embodiments. Rather, the systems and methods described herein should only be limited in light of the claims that follow when taken in conjunction with the above description and accompanying drawings.

What is claimed is:

1. A method for authenticating a document having a radiofrequency identification (RFID) tag including a digital signature, the method comprising:
    obtaining, at a copier, the digital signature from the RFID tag in response to an attempt to copy the document on the copier by an individual;
    verifying the individual attempting to copy the document based on a comparison of at least one biometric characteristic of the individual attempting to access the document with at least a portion of a biometric characteristic of an individual authorized to access the document associated with the obtained digital signature; and
    in response to successfully verifying the individual attempting to copy the document, granting the individual access to copy the document, wherein the individual is granted access to copy the document by activating a lighting feature in the copier that allows the copier to copy at least a portion of contents of the document that is only visible when viewed with the lighting feature.

2. The method of claim 1, wherein the at least a portion of text from the document includes all of the text contained within the document.

3. The method of claim 1, wherein the at least a portion of text from the document includes only certain words contained within the document.

4. The method of claim 1, wherein the at least a portion of text from the document includes only certain letters or symbols contained within the document.

5. The method of claim 1, wherein the at least a portion of text from the document includes a security print.

6. The method of claim 1, wherein the at least a portion of text from the document includes a micro-print.

7. The method of claim 1, further comprising reading the digital signature out of the RFID tag and verifying the digital signature using a key.

8. The method of claim 7, further comprising obtaining the key used to verify the digital signature from a hologram included in the document.

9. The method of claim 7, further comprising obtaining the key used to verify the digital signature from an optical memory attached to the document.

10. The method of claim 7, further comprising obtaining the key used to verify the digital signature from a bar code attached to the document.

11. The method of claim 1, further comprising locking the RFID tag after the digital signature is written thereto.

12. The method of claim 1, wherein the digital signature is generated based on a message and a key, the message based, in part, on contents of the document and the biometric characteristic of the individual authorized to access the document.

13. The method of claim 12, wherein the message is formed based on optical character recognition characteristics of the at least a portion of the content of the document that is only visible when viewed with the lighting feature and the biometric characteristics of the individual authorized to access the document.

14. The method of claim 12, wherein the biometric characteristics of the individual authorized to access the document is obtained from the individual authorized to access the document separately from the document.

15. The method of claim 12, further comprising obtaining, separate from the document, biometric characteristics from a holder or owner of the document, and wherein the message is further formed based on the biometric characteristics of the holder or owner of the document.

16. The method of claim 1, wherein the at least the portion of the contents of the document that is only visible when viewed with the lighting feature is printed with an ink that is only visible when exposed by light from the lighting feature.

* * * * *